US012760501B2

(12) United States Patent
Schlesser et al.

(10) Patent No.: US 12,760,501 B2
(45) Date of Patent: Oct. 13, 2026

(54) USAGE PROFILE MONITORING AND FEEDBACK FOR TRACK UNITS OF A WORK VEHICLE

(71) Applicant: Deere & Company, Moline, IL (US)

(72) Inventors: Walter M. Schlesser, Dubuque, IA (US); Nicholas J. Hoefler, Dubuque, IA (US); Adam G. Harwood, Dubuque, IA (US)

(73) Assignee: Deere & Company, Moline, IL (US)

( * ) Notice: Subject to any disclaimer, the term of this patent is extended or adjusted under 35 U.S.C. 154(b) by 430 days.

(21) Appl. No.: 18/507,589

(22) Filed: Nov. 13, 2023

(65) Prior Publication Data

US 2025/0154748 A1 May 15, 2025

(51) Int. Cl.
*E02F 9/26* (2006.01)
*E02F 9/20* (2006.01)
*G07C 5/08* (2006.01)

(52) U.S. Cl.
CPC ............ *E02F 9/267* (2013.01); *E02F 9/2025* (2013.01); *G07C 5/08* (2013.01)

(58) Field of Classification Search
CPC ........... E02F 9/267; E02F 9/2025; G07C 5/08
See application file for complete search history.

(56) References Cited

U.S. PATENT DOCUMENTS 5,361,211 A * 11/1994 Lee ......................... F15B 11/05 701/50
5,493,798 A 2/1996 Rocke et al.
6,247,538 B1 6/2001 Takeda et al.
6,691,566 B2 2/2004 Iwasaki et al.
7,934,329 B2 5/2011 Mintah et al.
8,207,839 B2 6/2012 Fujita et al.
8,600,917 B1 12/2013 Schimert et al.
9,074,546 B2 7/2015 Asami et al.
9,187,879 B2 11/2015 Suk
9,315,178 B1 4/2016 Ferguson et al.
9,347,389 B2 5/2016 Kawaguchi et al.
(Continued)

FOREIGN PATENT DOCUMENTS

JP 2004092141 A * 3/2004 ............... E21D 9/08
WO 2012157381 A1 11/2012

*Primary Examiner* — Catherine T. Rastovski
*Assistant Examiner* — Lal Ce Mang
(74) *Attorney, Agent, or Firm* — Gary L. Montle; Lucian Wayne Beavers; Patterson Intellectual Property Law, PC

(57) ABSTRACT

Computer-implemented systems and methods are provided for usage profile monitoring with respect to ground-engaging track units of work vehicles, driven according to selected track commands. Respective usage values are ascertained corresponding to a duty cycle of the track unit operating at each of one or more selected track commands over a specified (e.g., rolling) time period, wherein the respective usage values are further scaled according to specified factors associated with the respective track commands. An output signal is generated corresponding to a determined intervention event, for example an alert to the operator based on a detected or predicted exceeding of a specified target, based at least in part on the scaled usage values. The specified target may, e.g., be based on a current estimated life state of the track unit relative to an estimated life cycle, or a specified total number of hours the track unit has been in operation.

20 Claims, 4 Drawing Sheets

(56) References Cited

U.S. PATENT DOCUMENTS

| | | | | |
|---|---|---|---|---|
| 9,558,600 | B2 | 1/2017 | Rice et al. | |
| 9,846,978 | B1 | 12/2017 | Tseng et al. | |
| 11,155,288 | B2 | 10/2021 | Majewski et al. | |
| 12,487,596 | B1 * | 12/2025 | Sadilek | G05D 1/0088 |
| 2015/0134189 | A1 * | 5/2015 | Wash | G07C 5/006 701/29.4 |
| 2016/0003171 | A1 * | 1/2016 | Ge | E02F 9/267 701/102 |
| 2016/0258128 | A1 | 9/2016 | Nakamura et al. | |
| 2019/0351944 | A1 * | 11/2019 | Singh | F16H 39/02 |
| 2019/0359240 | A1 * | 11/2019 | Domingos | B61L 27/33 |
| 2020/0042023 | A1 | 2/2020 | Garvin et al. | |
| 2020/0224384 | A1 * | 7/2020 | Suzuki | E02F 3/435 |
| 2021/0132599 | A1 | 5/2021 | Narayanan et al. | |
| 2021/0340729 | A1 * | 11/2021 | Sulzer | G05D 1/0088 |
| 2022/0015298 | A1 | 1/2022 | Kraus | |
| 2022/0135036 | A1 | 5/2022 | Dongare et al. | |
| 2022/0316502 | A1 * | 10/2022 | Cliff | E02F 9/2058 |
| 2024/0003309 | A1 * | 1/2024 | Ramberg | F02D 41/1406 |

* cited by examiner

| Tracking Commands (402) | Scaling Factor (404) | Duty Cycle (on % / 10 minute window) (406) | Usage Value (408) | Rolling 10 minute (410) | Count 10 minute (412) |
|---|---|---|---|---|---|
| Straight Tracking - Forward | 1 | 40% | 0.40 | 600 | 240 |
| Straight Tracking - Reverse | 2 | 25% | 0.50 | 600 | 300 |
| Counter Rotation / Single | 4 | 10% | 0.40 | 600 | 240 |

Total Count 10 Minute Window: 780

FIG. 4

| Machine Hours (502) | Total Count of Duty Cycle Threshold to send warning (504) |
|---|---|
| <25 | 750 |
| <50 | 800 |
| <100 | 850 |
| <250 | 900 |
| >250 | 950 |

FIG. 5

USAGE PROFILE MONITORING AND FEEDBACK FOR TRACK UNITS OF A WORK VEHICLE

FIELD OF THE DISCLOSURE

The present disclosure relates generally to work vehicles having one or more ground-engaging track units, and more particularly to systems and methods of usage profile monitoring for such track units utilizing onboard data, for example providing control signals and/or operator feedback to improve track unit life by warning them of/when they are over utilizing the track units.

BACKGROUND

Work vehicles within the scope of the present disclosure, which may also be referred to herein as work machines, may for example include not only hydraulic excavators but loaders, crawlers, motor graders, backhoes, forestry machines such as feller bunchers, front shovel machines, and others. These work vehicles, or at least versions of such vehicles which are the primary but non-exclusive focus of the present disclosure, may typically have tracked ground engaging units supporting a frame and/or undercarriage from the ground surface.

Improper track unit break-in can result in early and expensive downtime for owners and operators of tracked work vehicles. If such a work vehicle is tracked at an excessive duty cycle, especially early in the life cycle of a work vehicle-track unit combination, premature failures can result in the track units.

Most users do not fully understand the details around how and when to break in track systems, or how much and when to pause tracking (e.g., to allow component cooling). The amount of recommended track unit duty cycle (as a percentage) typically increases as the components wear in, without ever reaching one hundred percent.

One of skill in the art may appreciate that certain tracking operations generally result in accelerated wear with respect to straight tracking in a forward direction. For example, tracking in a reverse direction causes accelerated wear with respect to tracking in a forward direction, whereas track unit counter rotation or turning (one track stopped or at significantly less drive level) may cause still further accelerated loading and accelerated wear with respect to straight tracking in either direction, but such relationships are not readily known or understood, much less accounted for in typical practice.

BRIEF SUMMARY

The current disclosure provides an enhancement to conventional systems, at least in part by introducing a novel system and method for usage profile monitoring and corresponding feedback, wherein usage of track units may preferably be regulated in a manner appropriate to a current life state (e.g., number of hours in operation, alone or weighted for types of usage) along a respective life cycle (e.g., estimated number of total available hours of operation, alone or weighted for historical and predicted types of usage).

Illustrative systems and methods as disclosed herein may monitor track unit commands and create a counter for track unit duty cycle calculation/monitoring. The total count value needed to send a warning to the operator may typically increase as the machine accumulates hours. If a counter trigger threshold is reached, selective feedback may be provided such as for example displaying a message to the operator suggesting a pause in the tracking operation.

Such systems and methods may in various aspects be reset when a particular track unit is updated or replaced (e.g., new rollers, new chain, etc.).

One of skill in the art may appreciate that feedback in the context of monitored track unit commands and derived information therefrom may be utilized as part of other improvements in track unit life cycle management, work vehicle performance, etc. For example, if work vehicle characteristics such as track unit drive pressure or load are incorporated with respect to the algorithms and/or models disclosed herein, enhanced estimation of duty cycle, system wear, etc., may be facilitated. As another example, if boom/stick movements were incorporated, operator performance and usage profiles could be established and possible improvements suggested based on analysis thereof.

According to an embodiment as disclosed herein, a computer-implemented method is provided for usage profile monitoring with respect to a ground-engaging track unit of a work vehicle, wherein the ground-engaging track unit is driven according to selected track commands. The method comprises ascertaining respective usage values corresponding to a duty cycle of the track unit operating at each of one or more selected track commands over a specified time period, wherein the respective usage values are further scaled according to specified factors associated with the respective track commands, and generating an output signal corresponding to a determined intervention event, based at least in part on the scaled usage values.

In an exemplary aspect according to the above-referenced embodiment, the scaled usage values may be aggregated over a specified rolling time period, and the intervention event determined based on a comparison of the aggregated scaled usage values with respect to a target value for the track unit.

In another exemplary aspect according to the above-referenced embodiment, the target value may be: a progressively defined threshold for a current estimated life state with respect to an estimated life cycle of the track unit, and/or for a calculated amount of operating time for the track unit.

In another exemplary aspect according to the above-referenced embodiment, the target value may further or in the alternative be determined by reference to modeled characteristics for the track unit. In such cases, the usage value may be scaled according to the modeled characteristics for the track unit.

Inputs may be received over time from a plurality of work vehicles having respective track units, the inputs from each work vehicle comprising current and/or historical track unit usage information, wherein one or more models are developed having respective life cycle characteristics, respective models being selectively retrievable to ascertain the modeled characteristics for determining the target value and scaling of the usage value for the track unit with respect to a respectively estimated life state and/or monitored usage profile.

In another exemplary aspect according to the above-referenced embodiment, the respective inputs from each work vehicle further comprise one or more of: track unit drive pressure; vehicle load; and detected movements of a user interface tool corresponding to track commands.

In another exemplary aspect according to the above-referenced embodiment, modeled characteristics for the track unit may be developed at least in part according to historical inputs over time and comprising one or more of:

track unit drive pressure; vehicle load; substrate conditions; and detected movements of a user interface tool corresponding to track commands.

In another exemplary aspect according to the above-referenced embodiment, the method may comprise generating a profile for an operator of the work vehicle based at least in part on previously determined intervention events and/or detected movements of a user interface tool corresponding to the track commands for the usage values, and determining the intervention event further based at least in part on the profile for the operator.

In another exemplary aspect according to the above-referenced embodiment, the method may comprise resetting an estimated life cycle for a vehicle-track unit combination based on a detected change to one or more components of the track unit.

In another exemplary aspect according to the above-referenced embodiment, the method may comprise estimating a new life cycle for a vehicle-track unit combination based on a detected change to one or more components of the track unit.

In another exemplary aspect according to the above-referenced embodiment, a type of the intervention event may be based at least in part on the scaled usage value. The output signal may be provided to a display unit associated with an operator of the work vehicle, wherein a display message is generated corresponding to the type of intervention event. The output signal may further or in the alternative be provided to one or more actuators associated with the track unit and/or work vehicle, for controllably adjusting one or more operations of the track unit and/or work vehicle corresponding to the type of intervention event.

In another embodiment as disclosed herein, a work vehicle may comprise a ground-engaging track unit driven in a forward or backward direction, independently or in conjunction with one or more other ground-engaging track unit of the work vehicle, according to selected track commands provided via a user interface tool. A controller is configured to direct the performance of steps in a method according to the above-referenced embodiment and optionally one or more of the recited aspects thereof.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 4 is a table representing an exemplary calculation of duty cycle counts dependent in part on the provided track unit commands during a defined time window.

FIG. 5 is a table representing an exemplary duty count threshold dependent in part on the total number of hours operated.

DETAILED DESCRIPTION

The implementations disclosed in the above drawings and the following detailed description are not intended to be exhaustive or to limit the present disclosure to these implementations. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

Although not shown in the accompanying drawings, a system as disclosed herein may include one or more processors, such as for example implemented in servers (e.g., host data center), alone or in a networked arrangement such as in a cloud computing environment, and configured to direct the performance of at least some operations such as for example steps in a method as further described below. The one or more processors are communicatively linked to one or more work vehicles 100, and may be further linked to one or more remote user computing devices, for example via respective communications networks which may be the same or different in configuration. The system may in some embodiments include vehicle controllers associated with one or more of the work vehicles 100 or computer program products residing thereon, and/or one or more of the remote user computing devices or computer program products residing thereon, and/or may merely comprise the one or more servers.

Figure 1:
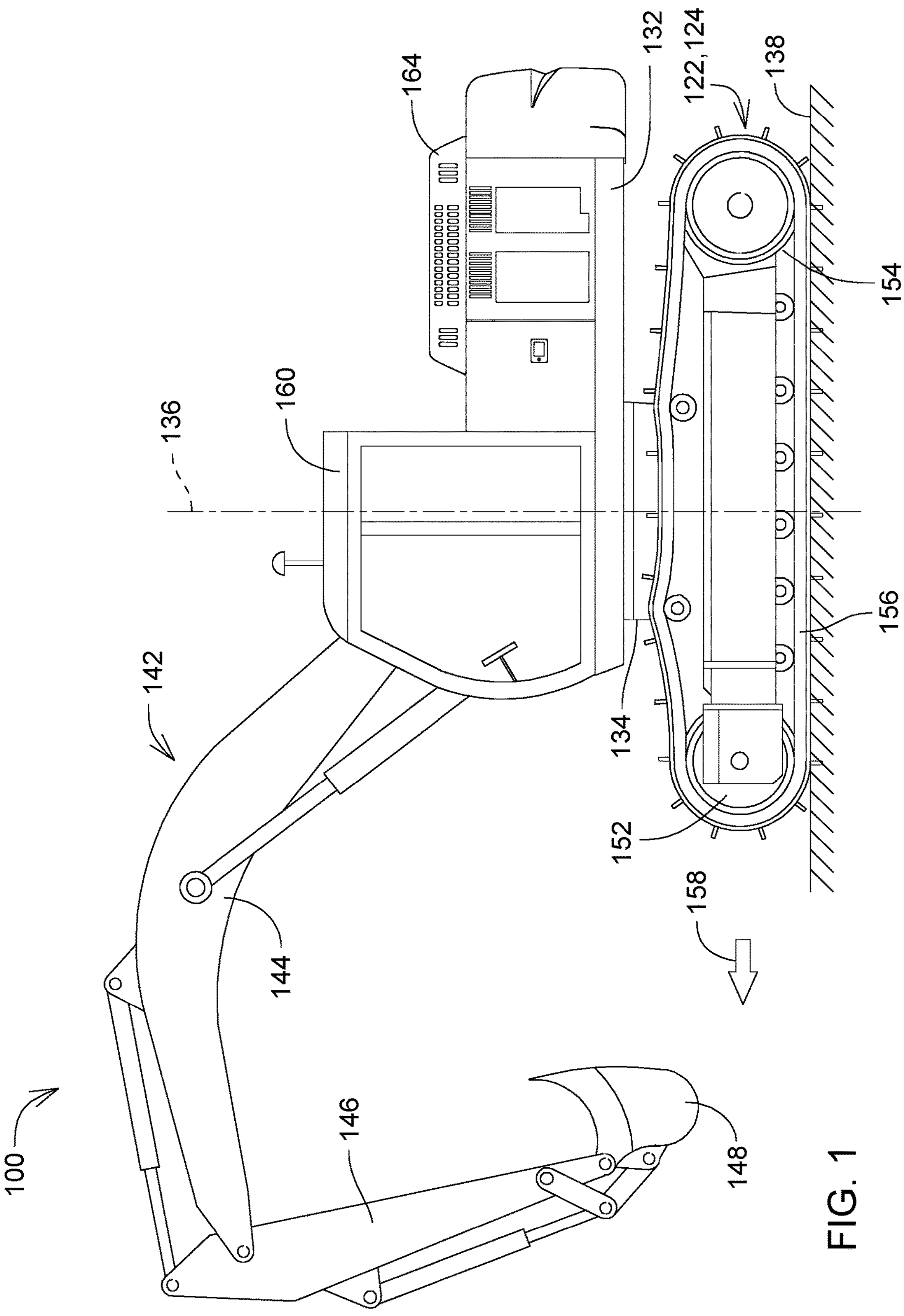
FIG. 1 is a side view representing an exemplary work vehicle according to the present disclosure.

FIG. 1 depicts a representative self-propelled work vehicle 100 in the form of, for example, a tracked excavator machine. Other examples of tracked work vehicles such as forestry feller bunchers are however also expressly contemplated within the scope of the present disclosure. The work vehicle 100 includes an undercarriage 122 including at least first and second ground engaging units 124 and first and second travel motors (not shown) for driving the first and second ground engaging units 124, respectively.

A main frame 132 is supported from the undercarriage 122 by a swing bearing 134 such that the main frame 132 is pivotable about a pivot axis 136 relative to the undercarriage 122. The pivot axis 136 is substantially vertical when a ground surface 138 engaged by the ground engaging units 124 is substantially horizontal. A swing motor (not shown) is configured to pivot the main frame 132 on the swing bearing 134 about the pivot axis 136 relative to the undercarriage 122.

In an embodiment, a swing angle sensor (not shown) may include an upper sensor part mounted on the main frame 132 and a lower sensor part mounted on the undercarriage 122. Such a swing angle sensor may be configured to provide a swing (or pivot) angle signal corresponding to a pivot position of the main frame 132 relative to the undercarriage 122 about the pivot axis 136. The swing angle sensor may for example be a Hall Effect rotational sensor including a Hall element, a rotating shaft, and a magnet, wherein as the angular position of the Hall element changes, the corresponding changes in the magnetic field result in a linear change in output voltage. Other suitable types of rotary position sensors include rotary potentiometers, resolvers, optical encoders, inductive sensors, and the like.

A work implement 142 in the context of the referenced work vehicle 100 includes a boom assembly 142 with a boom 144, an arm 146 pivotally connected to the boom 144, and a working tool 148. The term "implement" may be used herein to describe the boom assembly (or equivalent thereof) collectively, or individual elements of the boom assembly or equivalent thereof. The boom 144 is pivotally attached to the main frame 32 to pivot about a generally horizontal axis relative to the main frame 132. The working tool in this embodiment is an excavator shovel (or bucket) 148 which is pivotally connected to the arm 146. The boom assembly 142 extends from the main frame 132 along a working direction of the boom assembly 142. The working direction can also be described as a working direction of the boom 144. As described herein, control of the work implement 142 may relate to control of any one or more of the associated components (e.g., the boom 144, arm 146, and/or tool 148).

It is within the scope of the present disclosure that the work vehicle 100 may take various alternative forms and further utilize alternative work implements 142 to modify the proximate terrain.

In the embodiment of FIG. 1, the first and second ground engaging units 124 are tracked ground engaging units. Each of the tracked ground engaging units 124 includes an idler 152, a drive sprocket 154, and a track chain 156 extending around the idler 152 and the drive sprocket 154. The travel motor of each tracked ground engaging unit 124 drives its respective drive sprocket 154. Each tracked ground engaging unit 124 is represented as having a forward traveling direction 158 defined from the drive sprocket 154 toward the idler 152. The forward traveling direction 158 of the tracked ground engaging units 124 also defines a forward traveling direction 158 of the undercarriage 122 and thus of the work vehicle 100. In some applications, including uphill travel as further discussed below, the orientation of the undercarriage 122 may be reversed such that a traveling direction of the work vehicle 100 is defined from the idler 152 toward its respective drive sprocket 154, whereas the work implement (s) 142 is still positioned ahead of the undercarriage 122 in the traveling direction.

An operator's cab 160 may be located on the main frame 132. The operator's cab 160 and the boom assembly 142 may both be mounted on the main frame 132 so that the operator's cab 160 faces in the forward traveling direction 158 of the work vehicle 100. A control station (not shown) may be located in the operator's cab 160.

Also mounted on the main frame 132 is an engine 164 for powering the work vehicle 100. The engine 164 may be a diesel internal combustion engine. The engine 164 may drive a hydraulic pump to provide hydraulic power to the various operating systems of the work vehicle 100.

While track unit usage monitoring features as disclosed herein may be implemented in a closed system associated with an individual work vehicle 100 such as illustrated in FIG. 1, some embodiments of a system as disclosed herein may include centralized computing nodes (e.g., a cloud server) in functional communication with a plurality of distributed data collectors and controllers (e.g., associated with individual work vehicles) for effectively implementing models as further disclosed below.

Figure 2:
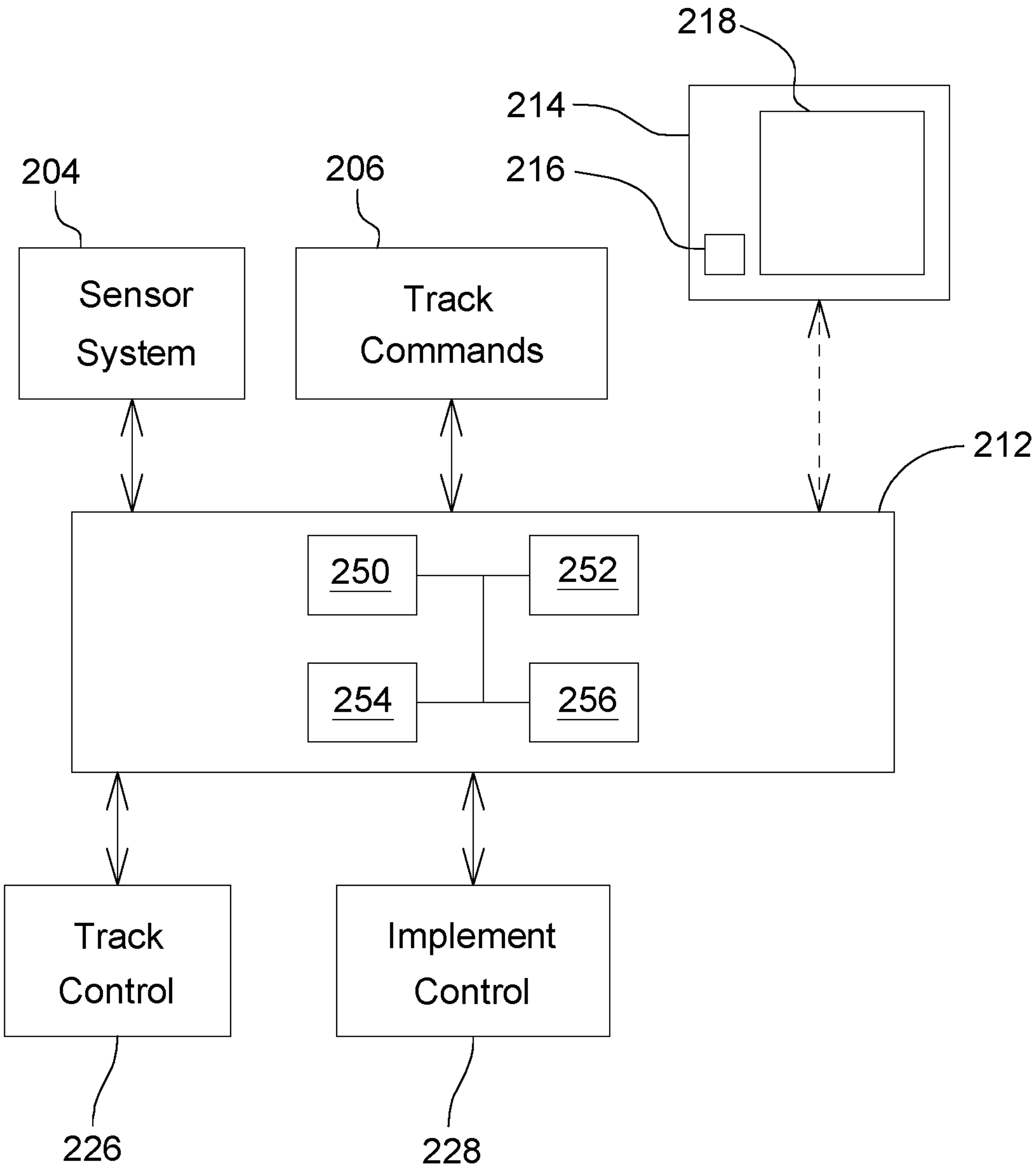
FIG. 2 is a block diagram representing a work vehicle control system according to an embodiment of the present disclosure.

As schematically illustrated in FIG. 2, an exemplary embodiment of a control system 200 includes a controller 212 that is onboard a work vehicle 100 and configured to perform functions as disclosed herein, or at least obtain data and transmit said data to a remote server to perform certain of the functions and/or computations as disclosed herein. The controller 212 may be portable or otherwise modular as part of a distributed work vehicle control system, or otherwise may be integrally provided with respect to a central work vehicle control unit (not shown).

The controller 212 may be configured to receive input signals from some or all of various sensors collectively defining a sensor system 204. Various sensors in the sensor system 204 may typically be discrete in nature, but signals representative of more than one input parameter may be provided from the same sensor, and the sensor system 204 may further refer to signals provided from the machine control system.

The sensor system 204 may according to particular embodiments described herein provide signals representative of a track unit drive pressure and/or a load, but various additional operating characteristics may be relevant such as a vehicle frame position (e.g., pivot angle of the frame relative to the undercarriage), vehicle speed, implement position, slope of a ground surface 138 presently being traversed, forward inclination of the ground surface 138 being traversed, etc. Accordingly, the sensor system 204 may include for example inertial measurement units (IMUs) mounted to respective components of the work implement 142 and/or main frame 132, sensors coupled to piston-cylinder units to detect the relative hydraulically actuated extensions thereof, global positioning system (GPS) sensors, vehicle speed sensors, and the like. In an embodiment, any of the aforementioned sensors may be supplemented using radio frequency identification (RFID) devices or equivalent wireless transceivers on one or more components of the work implement 142, the main frame 132, or the like.

The controller 212 may be configured to detect track unit commands corresponding to manual engagement with user interface tools 206 residing in the operator cab 160, such as for example one or more joysticks, levers, buttons, and the like.

The controller 212 may be configured to produce outputs to, or receive inputs from, a user interface 214 which may be associated with an integrated or portable/modular unit within the operator cab 160 and having a display unit 218. An exemplary user interface 214 as disclosed herein accordingly may selectively display outputs such as status indications and/or otherwise enable user interaction such as the providing of inputs to the system. Such inputs may be provided via interface tools 216 such as buttons or the like associated with the user interface 214, such as for example rendered as part of a touchscreen display or otherwise as a discrete input/output device 216. In the context of a portable user interface 214, such as for example may be associated with a mobile computing device for an operator, data transmission between for example the vehicle control system and the user interface 214 may take the form of a wireless communications system and associated components as are conventionally known in the art. In certain embodiments, a mobile user interface 214 and vehicle control systems for respective work vehicles 100 may be further coordinated or otherwise interact with a remote server or other computing device for the performance of operations in a system as disclosed herein.

The controller 212 may in various embodiments be configured to generate control signals for controlling the operation of respective actuators, or signals for indirect control via intermediate control units, associated with a track control unit 226, for example to regulate forward, reverse, turns, etc., and a vehicle implement control unit 228. The control systems 226, 228 may be independent or otherwise integrated together or as part of a machine control unit in various manners as known in the art. The controller 212 may for example generate control signals for controlling the operation of various actuators, such as hydraulic motors or hydraulic piston-cylinder units (not shown), and electronic control signals from the controller 212 may actually be received by electro-hydraulic control valves associated with the actuators such that the electro-hydraulic control valves will control the flow of hydraulic fluid to and from the respective hydraulic actuators to control the actuation thereof in response to the control signal from the controller 212.

The controller 212 includes or may be associated with a processor 250, a computer readable medium 252, a communication unit 254, and data storage 256 such as for example a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communication unit 254 may support or provide communications between the controller 212 and external systems or devices, and/or support or provide communication interface with respect to internal components of the self-propelled work vehicle 100. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

Figure 3:
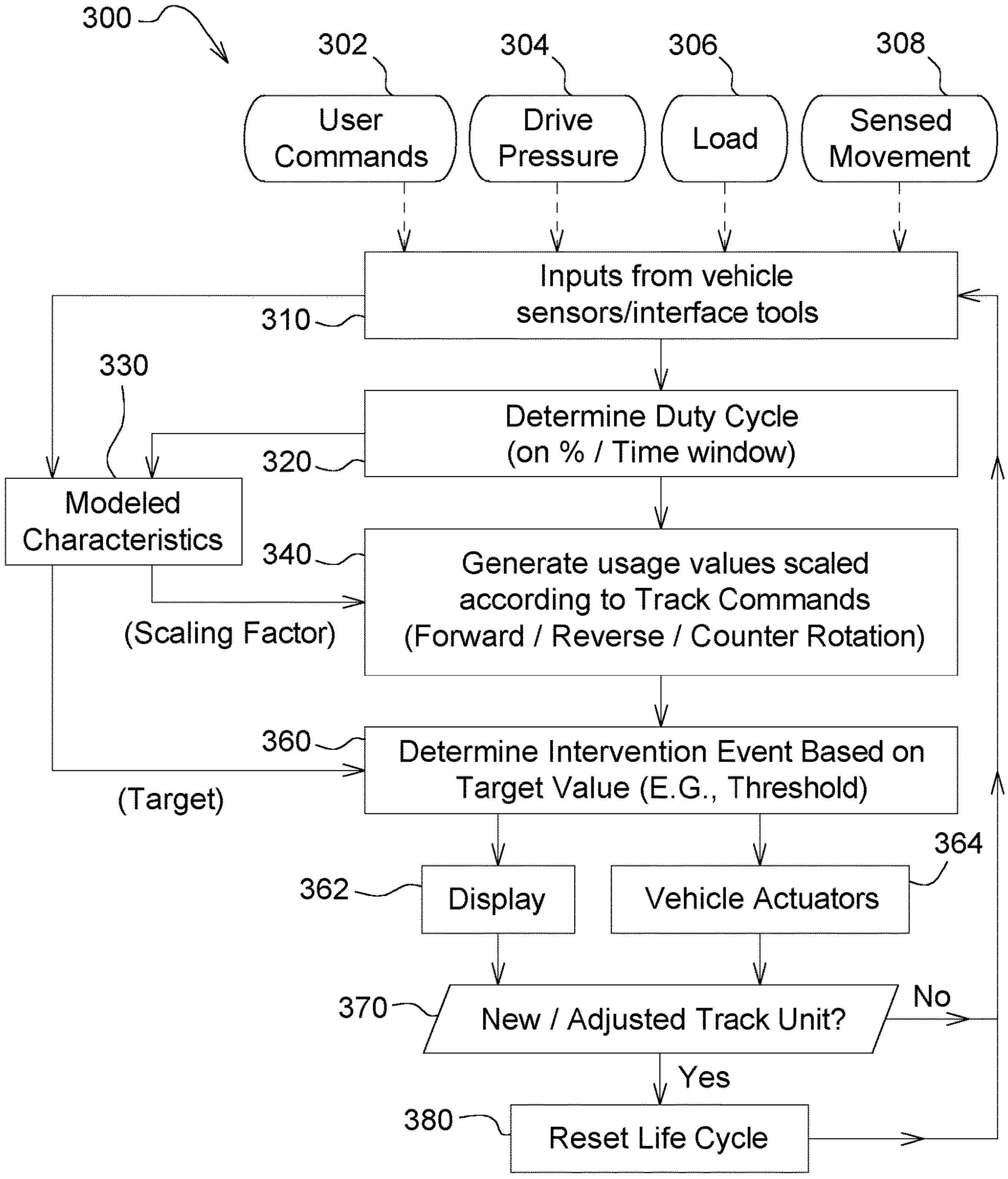
FIG. 3 is a flowchart representing an exemplary method according to an embodiment of the present disclosure.

Referring to FIG. 3, with further reference to FIGS. 4-5 for illustrative purposes, an exemplary embodiment of a method 300 may now be described for usage profile monitoring with respect to a ground-engaging track unit of a work vehicle, such as for example described above with respect to FIGS. 1 and 2.

The illustrated embodiment of a method 300 begins in step 310 with inputs being received from one or more work vehicle sensors or user interface tools, for example sensor system 204 and/or interface tools 206, 216. In a typical embodiment as further described herein, the inputs may include at least track unit command signals 302 (e.g., straight forward, straight reverse, counter rotation, etc.) but may further include inputs for or representative of track unit drive pressure 304, load 306, sensed movements or positions 308 of vehicle components, and the like. Other inputs may be detected, inferred, or otherwise manually entered via the user interface and applicable in various embodiments with respect to predicted life cycles of an undercarriage/track unit, such as for example conditions of a substrate (e.g., soil, gravel) being traversed and corresponding usage patterns.

Based on the received track command signals 302, a duty cycle for the track unit 124 is determined in step 320. In an embodiment, the duty cycle is continuously determined over rolling time windows of a defined duration, e.g., ten minutes, as a percentage of time in which the track unit 124 is operated according to a particular track command. Referring to FIG. 4 for one example of a ten minute window, a track unit 124 has been operated according to a "straight tracking-forward" tracking command 402 for a forty percent duty cycle 406 with respect to the window, a "straight tracking-reverse" tracking command 402 for a twenty-five percent duty cycle 406 with respect to the window, and a "counter rotation/single" tracking command 402 for a ten percent duty cycle 406 with respect to the window.

One of skill in the art may appreciate that the examples provided in FIGS. 4 and 5 are merely exemplary and illustrative in nature, and one of skill in the art may appreciate that various alternative embodiments for duty cycle-related calculations are fully contemplated as being within the scope of the present disclosure. For example, other time window durations other than ten minutes, or sequential time windows as opposed to rolling time windows, or alternative sets of potential tracking commands, are all within the scope of the present disclosure alone or in relevant combinations.

The method 300 may continue in step 340 with the generation of usage values scaled according to the different types of track commands. Again referring to the example illustrated in FIG. 3, the duty cycle 406 for "straight tracking-forward" tracking commands 402 may be scaled using a scaling factor 404 of one for a given time window, the duty cycle 406 for "straight tracking-reverse" tracking commands 402 may be scaled using a scaling factor 404 of two for the same time window (to reflect the increased amount of wear/impact on the life expectancy of the track unit), and the duty cycle 406 for "counter rotation/single" tracking commands 402 may be scaled using a scaling factor 404 of four for the time window (to reflect the still further increased amount of wear/impact on the life expectancy of the track unit resulting there from). Multiplying each of the duty cycles 406 (as a percentage value) by the corresponding scaling factor 404 yields a corresponding usage value 408 (e.g., 0.50 for the "reverse" tracking command). In the present example, the usage value 408 may be further multiplied by a number of time elements (e.g., seconds in the rolling ten minute window) 410 to yield a respective count value 412*a*, 412*b*, 412*c* for the time window, which when such respective count values 412*a*, 412*b*, 412*c* are summed for each of the tracking commands 402 produces a calculated total count value 412 (in this example, 780).

The method 300 may further continue in step 350 with a determination as to whether an intervention event has occurred based in part on the usage value(s) 408, and thereby in the present example the calculated total count value 412 derived there from, further in view of a target value which may in various embodiments correspond to a current life state of the work vehicle 100, track unit 124, or vehicle-track unit combination. Referring to the table on FIG. 5 for further illustration, exemplary respective thresholds 504 may be specified for each of a set of life states which correspond to a number of vehicle hours in operation 502. The thresholds may for example be progressively specified to account for recognized break-in capacity, and corresponding resiliency with respect to wear factors, of the track unit 124 over time.

In the present example, wherein the total count for a particular ten minute window is 780, if the work vehicle at issue has been operating for less than twenty-five hours an intervention event may be triggered based on the corresponding threshold of 750 having been exceeded. For any number of hours in operation above twenty-five, the corresponding threshold would be greater than 800 and therefore no intervention event triggered in this example. In an embodiment, a first type of intervention event may be specified wherein a first output is triggered when the threshold is exceeded, whereas a second type of intervention event may be specified wherein a second output is triggered when the threshold is not yet exceeded by is being approached, for example at a rate indicating that the threshold will likely be breached based on similarly continued use of the track unit 124. Here, the first output may correspond to a "stop" signal whereas the second output may for example correspond to a "caution" signal.

In the above-referenced example, the threshold may be progressively defined for a calculated simple amount of operating time for the work vehicle 100, track unit 124, or combination thereof. In another embodiment, the threshold may be progressively defined threshold for a current estimated life state with respect to an estimated life cycle of the track unit 124. For example, a track unit 124 may begin with an estimated number of hours of operating time, such as may be provided from a manufacturer or otherwise estimated using appropriate modeling techniques. The total number of hours may be characterized as 100% of a life cycle for the track unit 124 according to standard usage. However, as usage of the track unit 124 is monitored over time, non-standard usage may result in an estimated life state at a given time, for example as a percentage of the overall life cycle, that is different than would otherwise be the case based on aggregated hours of operation alone. A track unit 124 that is operated under heavier loads and/or using more frequent counter rotation than expected may result in an accelerated life state, whereas a track unit 124 that is operated at lighter load and/or predominantly under straight forward commands may have a slower progressing life state along a theoretical curve representing the expected life cycle. Threshold values may accordingly be assigned for respective increments of life state.

In some embodiments, appropriate scaling factors 404 for generating scaled usage values 408 in step 340 and/or appropriate target (e.g., threshold) values for determining intervention events in step 360 may be determined through physical testing and revised over time. The values may be stored in a look-up table and selectively retrieved from data storage/memory as needed.

In some embodiments, appropriate scaling factors 404 for generating scaled usage values 408 in step 340 and/or appropriate target (e.g., threshold) values for determining intervention events in step 360 may be determined dynamically using current information associated with the track unit 124 as compared with one or more track unit models and associated model characteristics, for example corresponding to the type of track unit, work vehicle-track unit combination, etc. Models may be developed using inputs (e.g., monitored track commands or other sensed inputs relating to track usage such as drive pressure and load, hours of operation, detected wear, failure condition) from or otherwise corresponding to various track units over time, and for example identifying correlations between track usage rate/duty cycle and increases in wear or otherwise changes in life state relative to expected changes in the context of an overall life cycle.

Changes in the scaling factors 404 and/or target values which are determined using modeling techniques may be automatically applied on a substantially continuous basis, for example where the models are capable of being locally developed and implemented, or may optionally be applied periodically or even manually. For example, models may be remotely generated in a cloud computing platform or the like, and downloaded periodically to individual work vehicles for local implementation.

Certain usage patterns may for example correlate with premature failure conditions. Different failure conditions may correspond to, e.g., a replacement of a track unit 124 before the expected life cycle completion, a replacement of respective components of the track unit 124 (e.g., new rollers, track chain, etc.), a failed or otherwise suspended operation of the work vehicle 100 based at least in part on track unit conditions, and the like.

A life cycle may in some embodiments be represented from start to (predicted) end by a curve representing wear-in for the track unit 124 over time, wherein variance in an estimated life state for a particular track unit 124 from an expected life state along the life cycle curve may result in adjustments to the modeled characteristics as applied for the scaling factor 404/target values at a given time. In some embodiments, a plurality of models may be developed and selectively applicable for a given track unit 124 based on a historical usage rate, record of intervention events, and the like.

Relevant modeling techniques may include the development of digital twin track unit models as virtual representations of respective types of track units 124, work vehicles 100, or vehicle-track unit combinations, potentially further in view of sub-models for respective life states, wherein digital and physical data are paired and combined with learning systems such as for example artificial neural networks. Real data from a particular track unit 124, work vehicle 100, or vehicle-track combination may be provided throughout the life cycle of the respective asset to generate a virtual representation of the track unit for estimation of life state, changes in life cycle, or other modeled characteristics, wherein subsequent comparison of the estimated values with a corresponding measured or determined actual value (e.g., pertaining to actual wear on one or more components of the track unit) may for example be implemented as feedback for machine learning algorithms executed at a server/cloud level.

Another example may utilize finite element analysis or other equivalent techniques as may be appreciated by one of skill in the art for modeling the track unit and predicting characteristics thereof for each life state relative to the overall life cycle.

Machine learning techniques may in some embodiments be performed onboard the work vehicle 100 via the above-referenced controller 212 or a processing unit functionally linked thereto, but in other embodiments a remote processing unit such as for example a cloud platform may be utilized in functional communication with the controller 212 to receive relevant inputs and perform some or all of the necessary model development functions. Labeling of data-sets, for example in accordance with measured or otherwise detected actual wear states or with failure conditions for the track units, may be performed using human inputs in a conventional manner or in some embodiments may preferably be automatically performed.

In an embodiment, which may for example complement models developed with respect to the track unit 124, work vehicle 100, or combinations thereof, respective profiles may be generated for operators of the work vehicle 100 to measure corresponding impacts upon the scaling factor 404 and/or target value generated at a given time. Such a profile may be empirically based on, e.g., previously determined intervention events and/or detected movements of a user interface tool corresponding to the track commands for the usage values, such that an estimated life state for the track unit 124 may be dynamically adjusted to account at least in part for operator-related impacts on the respective input parameters. If a first operator is known to consistently operate the work vehicle in a particular manner or under particular conditions, such information may be utilized to better predict how this usage will influence wear on the track unit and potentially further adjust, e.g., the above-referenced scaling factor 404 and/or target values.

Such influences may for example be represented as probability distributions, at least in that the observed variance in for example wear on a track unit 124 may be meaningfully correlated to the respective operators, such that a single prediction model would produce insufficiently precise results in the absence of some operator-specific analysis. The effects of probabilistic representation of the operator-specific factors may include that life state predictions made by models and algorithms as disclosed herein will also be probabilistic, i.e., according to a distribution having a measure of uncertainty dependent on part on the amount of observations and corresponding feedback data.

Returning to the method 300 as illustrated in FIG. 3, upon determining an intervention event output signals may further be generated for display to the operator or other user of the work vehicle (step 362), and/or in some embodiments to actuators associated with the work vehicle for automatic control of one or more components thereof, for example via track control unit 226 and/or implement control unit 228. For example, an alert may be generated prompting the operator to pause tracking for a specified number of minutes, or such an action may be automatically implemented.

In various embodiments, as long as the current track unit is not replaced or otherwise have one or more components thereof changed (i.e., "no" in response to the query in step 370), the method 300 returns to step 310 and proceeds according to the next sequential or rolling duty cycle 406. If a change with respect to the track unit is detected in step 370, the method 300 may further include a step 380 of resetting an estimated life cycle for the work vehicle-track unit combination, or estimating a new life cycle for the work vehicle-track unit combination based thereon.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for usage profile monitoring with respect to a ground-engaging track unit of a first work vehicle, wherein the ground-engaging track unit is driven according to selected track commands, the method comprising:

receiving input data sets over time from a plurality of work vehicles having respective track units, the inputs from each work vehicle comprising current and/or historical usage values corresponding to a duty cycle for the respective track unit and corresponding track commands;

developing, via a machine learning system, one or more models correlating the input data sets with respective changes in life state relative to expected changes in an overall life cycle;

for the first work vehicle, ascertaining respective usage values corresponding to a duty cycle of the track unit operating at each of one or more selected track commands over a specified time period, wherein the respective usage values are further scaled according to a selected one of the models and a respectively estimated life state and/or monitored usage profile; and generating an output signal corresponding to a determined intervention event, based at least in part on the scaled usage values, wherein a type of the intervention event is based at least in part on the scaled usage values, and wherein the output signal is provided to one or more actuators associated with the track unit and/or work vehicle, for controllably adjusting one or more operations of the track unit and/or work vehicle corresponding to the type of intervention event.

2. The method of claim 1, comprising:

aggregating the scaled usage values over a specified rolling time period; and determining the intervention event based on a comparison of the aggregated scaled usage values with respect to a target value for the track unit.

3. The method of claim 2, wherein the target value is a progressively defined threshold for a current estimated life state with respect to an estimated life cycle of the track unit.

4. The method of claim 2, wherein the target value is a progressively defined threshold for a calculated amount of operating time for the track unit.

5. The method of claim 2, wherein the target value is determined by reference to modeled characteristics for the track unit.

6. The method of claim 1, wherein the respective inputs from each work vehicle further comprise one or more of: track unit drive pressure; vehicle load; substrate conditions; and detected movements of a user interface tool corresponding to track commands.

7. The method of claim 2, comprising:

generating a profile for an operator of the work vehicle based at least in part on previously determined intervention events and/or detected movements of a user interface tool corresponding to the track commands for the usage values; and determining the intervention event further based at least in part on the profile for the operator.

8. The method of claim 2, comprising resetting an estimated life cycle for a vehicle-track unit combination based on a detected change to one or more components of the track unit.

9. The method of claim 2, comprising estimating a new life cycle for a vehicle-track unit combination based on a detected change to one or more components of the track unit.

10. The method of claim 1, wherein the machine learning system develops the one or more models at least in part by correlating the input data sets with additional inputs comprising actual wear states and/or failure conditions for the respective track units.

11. The method of claim 10, wherein for the first work vehicle, an actual wear state is measured or detected and compared to an estimated wear state corresponding to the ascertained usage values, and the comparison is implemented as feedback for the machine learning system and further development of at least the selected one of the one or more models.

12. A work vehicle comprising:

data storage having stored thereon one or more machine learning models correlating input data sets, comprising current and/or historical usage values corresponding to a duty cycle for respective track units and corresponding track commands with respective changes in life state relative to expected changes in an overall life cycle;

a ground-engaging track unit driven in a forward or backward direction, independently or in conjunction with one or more other ground-engaging track unit of the work vehicle, according to selected track commands provided via a user interface tool; and a controller configured to:

ascertain respective usage values corresponding to a duty cycle of the track unit operating at each of one or more selected track commands over a specified time period, wherein the respective usage values are further scaled according to a selected one of the models and a respectively estimated life state and/or monitored usage profile; and generate an output signal corresponding to a determined intervention event, based at least in part on the scaled usage values, wherein a type of the intervention event is based at least in part on the scaled usage values, and wherein the output signal is provided to one or more actuators associated with the track unit and/or work vehicle, for controllably adjusting one or more operations of the track unit and/or work vehicle corresponding to the type of intervention event.

13. The work vehicle of claim 12, wherein the controller is configured to:

aggregate the scaled usage values over a specified rolling time period; and determine the intervention event based on a comparison of the aggregated scaled usage values with respect to a target value for the track unit.

14. The work vehicle of claim 13, wherein the target value is a progressively defined threshold for a current estimated life state with respect to an estimated life cycle of the track unit.

15. The work vehicle of claim 13, wherein the target value is a progressively defined threshold for a calculated amount of operating time for the track unit.

16. A work vehicle comprising:

data storage having stored thereon one or more machine learning models correlating input data sets, comprising current and/or historical usage values corresponding to a duty cycle for respective track units and corresponding track commands with respective changes in life state relative to expected changes in an overall life cycle;

a ground-engaging track unit driven in a forward or backward direction, independently or in conjunction with one or more other ground-engaging track unit of the work vehicle, according to selected track commands provided via a user interface tool; and a controller configured to:

ascertain respective usage values corresponding to a duty cycle of the track unit operating at each of one or more selected track commands over a specified time period, wherein the respective usage values are further scaled according to a selected one of the models and a respectively estimated life state and/or monitored usage profile; and generate an output signal corresponding to a determined intervention event, based at least in part on the scaled usage values, wherein a type of the intervention event is based at least in part on the scaled usage values, and wherein the output signal is provided to a display unit associated with an operator of the work vehicle and generates a display message corresponding to the type of intervention event.

17. The work vehicle of claim 16, wherein the controller is configured to:

aggregate the scaled usage values over a specified rolling time period; and determine the intervention event based on a comparison of the aggregated scaled usage values with respect to a target value for the track unit.

18. The work vehicle of claim 17, wherein the target value is a progressively defined threshold for: a current estimated life state with respect to an estimated life cycle of the track unit; or a calculated amount of operating time for the track unit.

19. The work vehicle of claim 16, wherein the machine learning model is developed at least in part by correlating the input data sets with additional inputs comprising actual wear states and/or failure conditions for the respective track units.

20. The work vehicle of claim 19, wherein an actual wear state is measured or detected and compared to an estimated wear state corresponding to the ascertained usage values, and the comparison is implemented as feedback and further development of at least the selected one of the one or more models.

* * * * *